(12) United States Patent
Fowler et al.

(10) Patent No.: US 8,662,880 B2
(45) Date of Patent: Mar. 4, 2014

(54) CONTINUOUS MOTION ROTATING THERMOFORMING OF SOLUBLE POUCHES

(75) Inventors: James Fowler, St. Charles, IL (US); Boris Makutonin, Cincinnati, OH (US)

(73) Assignee: Rideau Machinery Inc., St. Charles, IL (US)

( * ) Notice: Subject to any disclaimer, the term of this patent is extended or adjusted under 35 U.S.C. 154(b) by 0 days.

(21) Appl. No.: 13/474,493

(22) Filed: May 17, 2012

(65) Prior Publication Data

US 2012/0235329 A1    Sep. 20, 2012

Related U.S. Application Data

(63) Continuation of application No. PCT/IB2010/003144, filed on Nov. 23, 2010.

(30) Foreign Application Priority Data

Nov. 23, 2009    (GB) .................................. 0920445.4

(51) Int. Cl.
*B29C 51/10*    (2006.01)

(52) U.S. Cl.
USPC ............ 425/388; 425/504; 264/554; 426/512

(58) Field of Classification Search
USPC .............. 425/388, 504, 174.4, 121, 122, 362; 264/547, 554; 426/512
See application file for complete search history.

(56) References Cited

U.S. PATENT DOCUMENTS

| | | | |
|---|---|---|---|
| 3,218,776 A | 11/1965 | Cole | |
| 3,353,329 A | 11/1967 | Cloud et al. | |
| 3,608,055 A * | 9/1971 | Long | 425/388 |
| 3,771,938 A * | 11/1973 | Pinto et al. | 425/174.4 |
| 3,964,237 A * | 6/1976 | Johansen | 425/388 |
| 4,265,070 A | 5/1981 | Mainberger et al. | |
| 4,375,146 A * | 3/1983 | Chung | 53/453 |
| 4,571,924 A | 2/1986 | Bahrani | |
| 4,863,693 A * | 9/1989 | Howell | 422/64 |
| 5,366,685 A | 11/1994 | Fujii et al. | |
| 6,811,802 B2 * | 11/2004 | van Esbroeck et al. | 426/389 |
| 6,814,905 B1 * | 11/2004 | Dalgewicz et al. | 264/37.32 |
| 2002/0169092 A1 | 11/2002 | Catlin et al. | |
| 2003/0230209 A1 | 12/2003 | Gonzalez et al. | |
| 2009/0260739 A1 | 10/2009 | Fischer et al. | |

FOREIGN PATENT DOCUMENTS

| | | |
|---|---|---|
| CA | 1263081 | 11/1989 |
| EP | 0408874 | 8/1995 |
| FR | 2754516 | 4/1998 |
| GB | 1106239 | 3/1968 |

(Continued)

OTHER PUBLICATIONS

International Search Report of International Application No. PCT/IB2010/003144, date of mailing Apr. 6, 2011, 4 pages.

*Primary Examiner* — Richard Crispino
*Assistant Examiner* — Thukhanh Nguyen
(74) *Attorney, Agent, or Firm* — Foley & Lardner LLP

(57) ABSTRACT

Soluble pouches are formed on a continous motion rotating thermoforming machine having cavities in the surface of a drum into which a web of polymeric film is drawn by a vacuum to form pockets. The pockets are filled with one or more components and closed by a further web of polymeric film. Shrink-back of the polymeric film within the cavities is reduced by heating the cavities with heaters.

28 Claims, 10 Drawing Sheets

(56) References Cited

FOREIGN PATENT DOCUMENTS

| GB | 1246941 | 9/1971 |
| GB | 1375580 | 11/1974 |
| JP | 48044190 U | 12/1973 |
| WO | WO00/53496 | 9/2000 |

* cited by examiner

1. GEL + POWDER
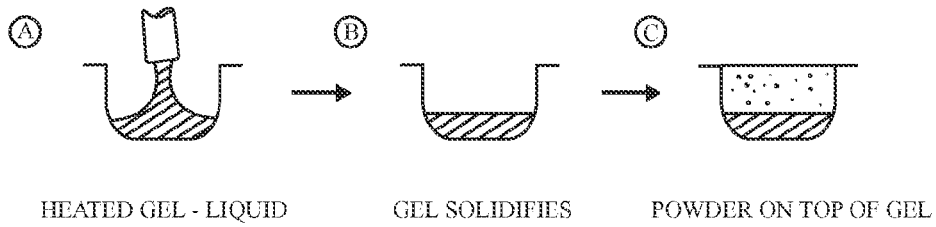
FIGURE 9.1
2. GEL + BALL + POWDER
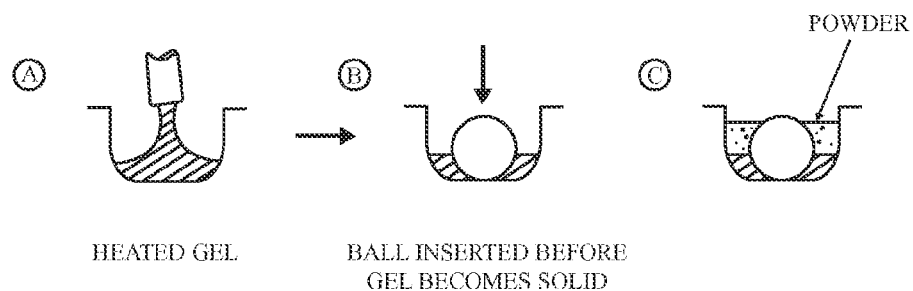
FIGURE 9.2
3. GEL + BALL, COATED IN-LINE OR OFF-LINE
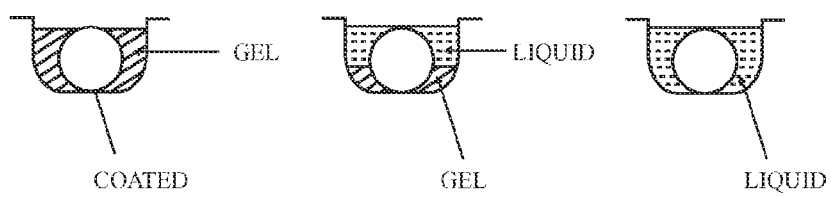
FIGURE 9.3

4. MULTIPLE GEL PRODUCTS WITH STATIONARY OR ROTATING NOZZLES
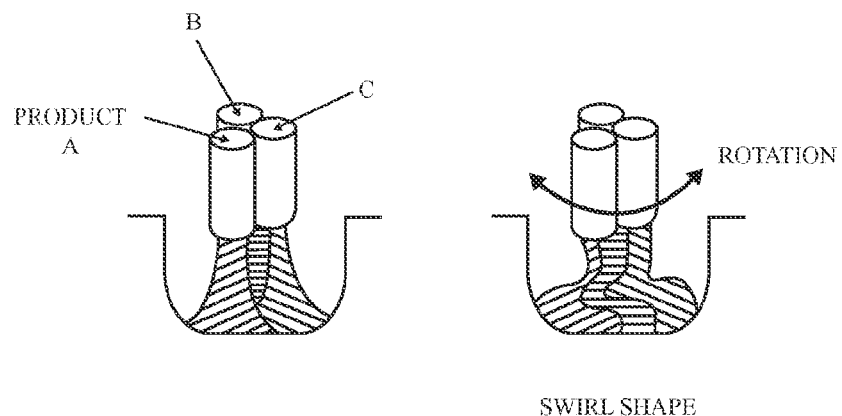
FIGURE 9.4

CONTINUOUS MOTION ROTATING THERMOFORMING OF SOLUBLE POUCHES

CROSS-REFERENCE TO RELATED PATENT APPLICATIONS

The present application is a Continuation of International Application No. PCT/IB2010/003144, filed Nov. 23, 2010, which claims the benefit of and priority to United Kingdom Patent Application No. 0920445.4, filed Nov. 23, 2009. The entire disclosures of International Application PCT/IB2010/003144 and United Kingdom Patent Application No. 0920445.4 are incorporated herein by reference.

BACKGROUND

This invention relates to soluble packages such as pouches containing one or more products and to apparatus and method for producing such pouches. The invention has particular, but not exclusive, application to thermoformed packages made from two or more webs comprising polymeric substrates. The webs are soluble or dispersible in a solvent and may comprise water soluble or water dispersible films.

Thermoformed packages comprising a single compartment are typically made in four steps:
1. Forming a pocket in a first web of film (the base web)
2. Filling of the pocket so formed
3. Closure of the pocket by means of a second web of film (the top or lidding web) to form a package.
4. Cutting or punching to release the package from the combined first and second webs of film Thermoformed packages are frequently made on intermittent horizontal machines in which the web is moved through the machine in intermittent steps allowing each operation described above to be carried out whilst the web or webs are stationary.

In such machines, once the base web is moved away from the forming mould, it begins to cool and unlike many insoluble polymeric substrates, many soluble webs, including particularly those comprising substantially polyvinyl alcohol, then experience a phenomenon known as shrink-back in which the thermoformed film tries to return to its pre-thermoformed condition thereby reducing the volume of the thermoformed pocket. This represents a major problem as the pocket will have reduced in size by the time that it is filled. To take account of the shrink-back and still maintain the required fill volume, the thermoformed pocket needs to be made larger than the fill volume so that it can accept the fill volume despite the effects of shrinkback. Designing a thermoforming mould with larger cavities requires either a deeper draw depth, which in turn often requires a thicker base web provoking slower subsequent dissolution, or a greater superficial area, known as the footprint, allowing fewer cavities in either the machine direction or across the web or both, thereby reducing machine and web material efficiencies.

A continuous motion rotary thermoforming machine for making thermoformed packages is disclosed in U.S. Pat. No. 3,218,776 in which the base web is heated to a plastic condition and immediately pressed on to the surfaces of the drum surrounding the pockets. A heated metal roller is employed to press the web of film against the surfaces of the drum. The roller is heated to a temperature sufficient to render the film plastic by the time that it is pressed against the continuously rotating drum. The actual temperature will vary depending upon the film, its thickness, and the length of time that it remains in contact with the heated roller. The film, by means of the heated roller, may be heated to about 140° F. (60° C.) but it might be as low as about 100° F. (37.8° C.) or as high as 300° F. (148.9° C.). A vacuum is applied to the base of the cavity in order to draw the web of heated film that covers the cavities into the cavities and define pockets to receive subsequently the product to be packaged. The vacuum should be applied instantly after the cavity is covered with film. In a subsequent operation, the top web is pressed against the base web, by now containing filled thermoformed pockets located upon the rotating drum, by means of a second heated roller which conductively heats the top web and, by means of a spring, presses the top web over the pockets containing the packaged product during which both webs are pressed together on the surfaces surrounding the pockets to achieve a bond. In the particular case where water-soluble packages are desired, the top web, prior to arrival at the sealing station, is made adhesive by moistening with a liquid in which the film of the top web is soluble, in order that the sealing process can be effected by a combination of heat and solvent welding.

In the machine disclosed in U.S. Pat. No. 3,218,776, two heated rollers provide the sole sources of heat, a first heated roller heating the base web prior to thermoforming and a second heated roller heating the lidding web prior to closure of the pouches. This has a number of disadvantages. Firstly, the base web begins to cool as soon as it leaves the first heated roller and a high vacuum is therefore required to hold the base web to the walls of the cavities and thereby inhibit the occurence of shrink-back. Secondly, the top web begins to cool as soon as it leaves the second heated roller, thereby preventing the strongest seal from being made between the base web and the top web.

Continuous motion rotating thermoforming offers advantages compared to intermittent motion horizontal thermoforming, particularly in respect of higher productivity and reduced shrink-back. Due to the higher productivity of continuous motion rotating machines, the time interval between thermoforming and filling is reduced, thereby allowing the thermoformed web less time to cool. Nevertheless, shrink-back of soluble webs has remained a problem, even with continuous motion rotary machines such as described in U.S. Pat. No. 3,218,776.

SUMMARY

According to an exemplary embodiment, a continuous motion rotating thermoforming machine for producing pouches made from two webs comprising soluble polymeric substrates includes a former having a plurality of pouch forming cavities around its periphery; a motor configured to continuously rotate the former so that the cavities follow an endless path in the direction of rotation of the former through forming, filling, sealing and cutting stations; one or more heaters disposed around the former for heating the cavities; and a vacuum configured to apply a vacuum through the base of each cavity in order that, once thermoformed, a base web is held tightly to the base of the cavities through filling, sealing and cutting stations until the vacuum is released and the filled and sealed pouch is ejected from its cavity.

According to another exemplary embodiment, a method of making a pouch from two webs comprising soluble polymeric substrates includes providing a former having a plurality of cavities around its periphery; providing one or more heaters around the former for heating the cavities; continuously rotating the former; heating the cavities; drawing a base web into the cavities using a vacuum to form pockets in the base web; filling the pockets with at least one component; closing the pockets with a top web to form a pouch; and heating the cavities and maintaining the vacuum after the step of drawing the base web into the cavities in order that, once thermoformed, the base web is held tightly to the base of the cavities through filling, sealing and cutting stations until the vacuum is released and the filled and sealed pouch is ejected from its cavity.

According to another exemplary embodiment, a method of making a pouch from three webs comprising soluble polymeric substrates wherein the base web is micro-perforated or porous comprises providing a former having a plurality of cavities around its periphery; providing one or more heaters around the former for heating the cavities; continuously rotating the former; heating the cavities; drawing a micro-perforated or porous base web into the cavities using a vacuum to form pockets in the base web; filling the pockets with at least one powder or granular product; closing the pockets with an intermediate web to create a lower compartment; evacuating the lower compartment through the micro-perforations in the base web; filling the pockets with at least one powder or granular product or liquid or gel product on top of the lower compartment; closing the upper compartment with a top web to create an upper compartment; and heating the cavities and maintaining the vacuum after drawing the base web into the cavities in order that, once thermoformed, the base web is held tightly to the base of the cavities through filling, sealing and cutting stations until the vacuum is released and the filled and sealed pouch is ejected from its cavity.

BRIEF DESCRIPTION OF THE DRAWINGS

FIGS. 9.1, 9.2, 9.3, and 9.4 illustrate various pouch filling operations for use with machines according to the invention.

DETAILED DESCRIPTION

Figure 1:
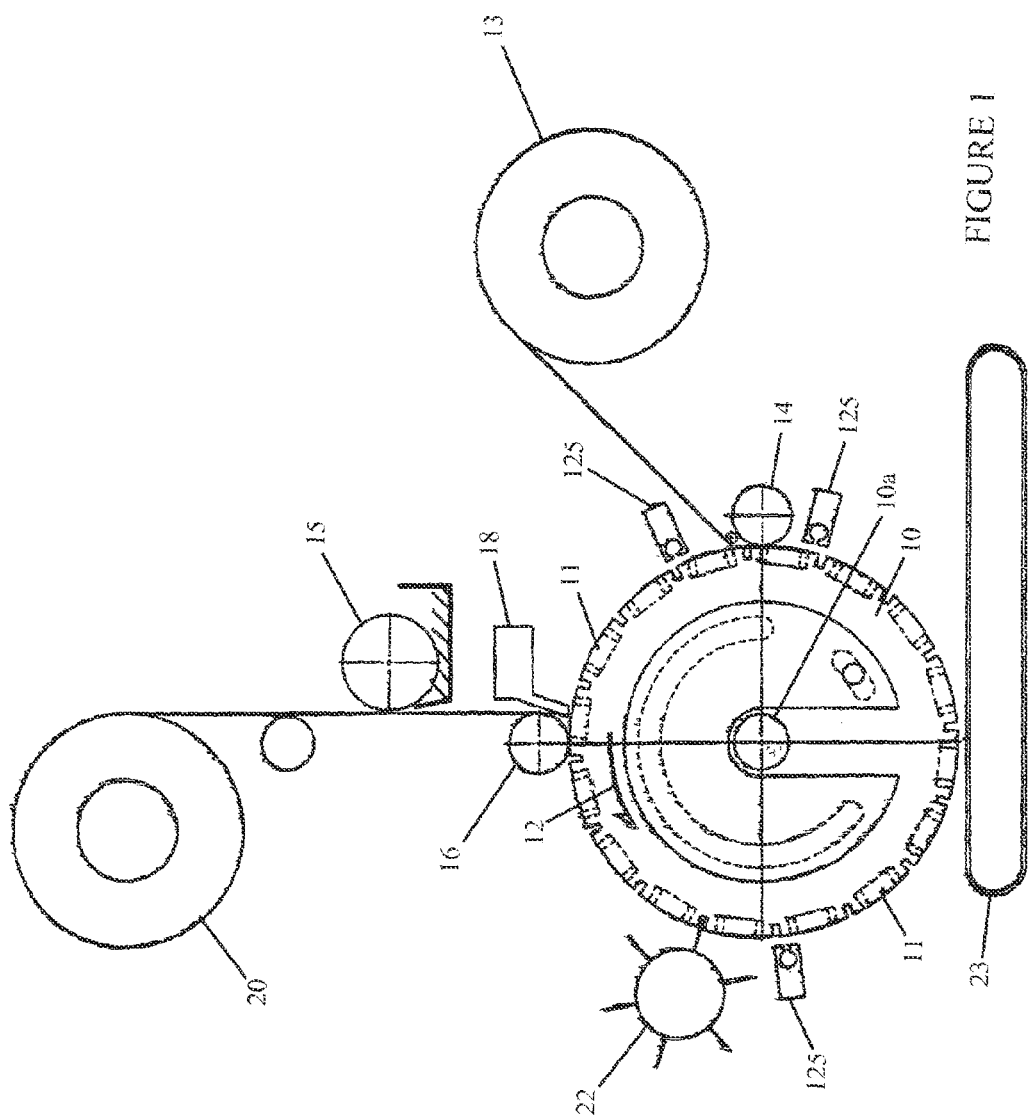
FIG. 1 is a schematic side view of a machine according to a first embodiment of the invention having external hot air heaters.

The present invention is intended to overcome or at least mitigate some of the problems and disadvantages aforementioned.

More especially, this invention seeks to address the problem of shrink-back of soluble webs in continuous motion rotating thermoforming machines.

A preferred aim of this invention is to provide an improved continuous motion rotating thermoforming machine to make thermoformed soluble packages containing one or more products and comprising one or more compartments.

As used herein, the term "soluble webs" refers to webs of polymeric substrates which can be dissolved in a solvent. In many cases, the requirement is for the pouch to dissolve in water or in an aqueous medium but dissolution in other solvents can be envisaged where the pouch is required to dissolve in a solvent other than water.

As used herein, the term "water soluble" refers to materials that are capable of being dissolved in water of whatever temperature to form a homogeneous solution and the term "water dispersible" refers to materials that are capable of being dispersed in water of whatever temperature to form a permanent or temporary suspension. For convenience, where the term "water soluble" is used hereinafter in the description and claims, it will be understood this includes "water dispersible".

As used herein, the term "mould" refers to a constituent part (containing one or more cavities) of a continuously rotatable former, the part often being designed to be easily exchanged within the former in order to produce pouches of different fill volume, the term "cavity" refers to that part of the mould into which a base web is drawn during a thermoforming operation, and the term "pocket" refers to an open container which is formed in a base web as a result of a thermoforming operation.

According to a first aspect of the invention, we provide a continuous motion rotating thermoforming machine for producing soluble pouches made from two or more webs comprising soluble polymeric substrates, the machine including a plurality of pocket forming cavities and means to heat the cavities.

As used herein, the terms "continuous motion rotating thermoforming machine" refers to a machine in which thermoforming is effected by means of cavities in a former that continues to turn while sequential operations required for the production of soluble pouches are carried out.

Preferably, means is provided for rotating the former so that the cavities follow an endless path in the direction of rotation of the former through forming, filling, sealing and cutting stations. The rotating means may comprise a motor, for example an electric motor, more preferably a variable speed electric motor.

The former may comprise a continuously rotating drum with cavities opening to the outer surface of the drum. Cavities may be arranged across the width of the drum and/or around the circumference of the drum. Alternatively, the former may comprise a continuously rotating endless belt with cavities opening to the outer surface of the belt. Cavities may be arranged across the width of the belt and/or along the length of the belt.

The arrangement and disposition of the cavities across and along an endless belt can be similar to the arrangement and disposition of the cavities around a drum. In either case, the cavities are heated and a vacuum is preferably maintained through the base of each cavity in order that, once thermoformed, a base web is held tightly to the base of the cavities through subsequent filling, sealing and cutting stations until the vacuum is released and the filled and sealed pouch is ejected from its cavity.

A rotating endless belt may allow the possibility of greater space for sequential operations, namely thermoforming, filling, and sealing, required for the production of soluble pouches from two or more webs according to this invention. Where the invention is practised using a rotating endless belt rather than a rotating drum, the greater space that may be made available for sequential operations along that portion of the rotating endless belt that is disposed horizontally, may be of particular value. The length of the rotating endless belt that is disposed horizontally can be varied in order to increase or decrease the space required to carry out sequential operations. The number of sequential operations will increase as the number of compartments in the soluble pouch increases. Thus, a rotating endless belt may be of particular value in the production of multi-compartment soluble pouches comprising more than two webs, where successive webs may be thermoformed, and the successive pockets so formed may be filled and sealed. However many compartments are contained within the soluble pouch, the top web that is sealed to the uppermost thermoformed web is not itself thermoformed.

The machine has particular application for the manufacture of water soluble pouches. Depending upon whether they are required for edible or non-edible applications, water-soluble webs can be substantially based upon polyvinyl alcohol (PVOH), polyethylene oxide, modified celluloses such as carboxy-methyl cellulose (CMC) and hydroxy-propyl methyl cellulose (HPMC), pullulan, certain types of starch, dextrin, guar gum, gelatine and their derivatives. In the case where one or more webs is based upon PVOH, their solubility at a given temperature may be adjusted by selecting a grade of PVOH with a specific molecular weight and a specific % saponification. By way of example only, to obtain solubilisation of a water-soluble film made substantially from PVOH in an aqueous medium at a temperature at or above 60° C., the PVOH should preferably be of a fully saponified type i.e. the degree of saponification ranging from 90-99.5%, and to obtain solubilisation in an aqueous medium at a temperature of 25° C. and below, the PVOH should be of a partially saponified type i.e. the degree of saponification ranging from 71-90%. Hence, the lower the degree of saponification, the lower the temperature of water required to dissolve a water soluble film made substantially from PVOH.

The heating means may be arranged externally and/or internally of the former and may be of any suitable type for heating the cavities. The cavities may be heated by convection, for example hot air heating, or radiation, for example infra-red heating or conduction, for example electrical heating. Preferably, the surface temperature of the cavities of the drum or endless belt is at least 60° C. According to a preferred embodiment of the invention, the drum or endless belt is heated to a temperature of between 60° C. and 200° C. (140° F. and 392° F.) in order to reduce or preferably eliminate the incidence of shrink-back and thereby improve the quality of thermoforming. This has the benefit of making the complete volume of the cavity available to receive the product to be filled. A further benefit is that the reduction or elimination of shrink-back allows the vacuum within the drum or endless belt to hold the filled pouches on the drum or endless belt, even after they are separated by cutting, until the vacuum is removed and the pouches are released from the drum or endless belt on to a conveyor or other suitable means for collecting/and or transferring the pouches away from the machine, for example to a packing unit. It will be evident that where shrink-back is pronounced, the base web of the filled pouches can draw itself away from the internal surfaces of the cavity thereby breaking the vacuum holding the filled pouches on the drum or endless belt. As a consequence, the filled pouches, after being separated from each other by cutting knives, will no longer be held tightly to the drum or endless belt and will fall away from the drum or endless belt before they arrive at the conveyor. For effective operation of continuous motion rotating thermoforming machines, it is essential that the pouches are held tightly to the drum or endless belt until they are released on to the conveyor.

Different levels of vacuum may be provided at different positions around the drum or endless belt as it rotates according to the demands of the production being carried out. By way of example which is by no means limiting, the level of vacuum required to draw the heated base web into the cavities and hold the base web in position, thereby avoiding shrink-back, until filling has been completed will be less than that required to hold the filled and sealed pouches on the drum or endless belt until they are ejected from the drum or endless belt by means of air blow off and fall on to the conveyor transporting the pouches away from the machine.

The heating of the drum or endless belt may be provided by precisely placed heaters, some examples of which are described below:

Externally mounted hot air heaters (shown at 125 in FIG. 1) are directed at the cavities in several locations around the former. An example of a suitable configuration is to locate the hot air heaters at approximately 4 o'clock, 2 o'clock and 8 o'clock, i.e. prior to the arrival of the base web over the heated roller 14, after the said roller 14 and after the transverse cutting knives 22 mounted on a rotating shaft. The number and position of these locations can be varied. The hot air heaters can be fabricated to different designs. For example, they can be formed from a hollow metal bar with a longitudinal bore in which a tubular heater is installed. Compressed air is supplied from the back and becomes heated as it moves over the tubular heater, escaping as a jet of hot air from the narrow slot facing the drum. This is schematically illustrated in FIG. 1.

Figure 2:
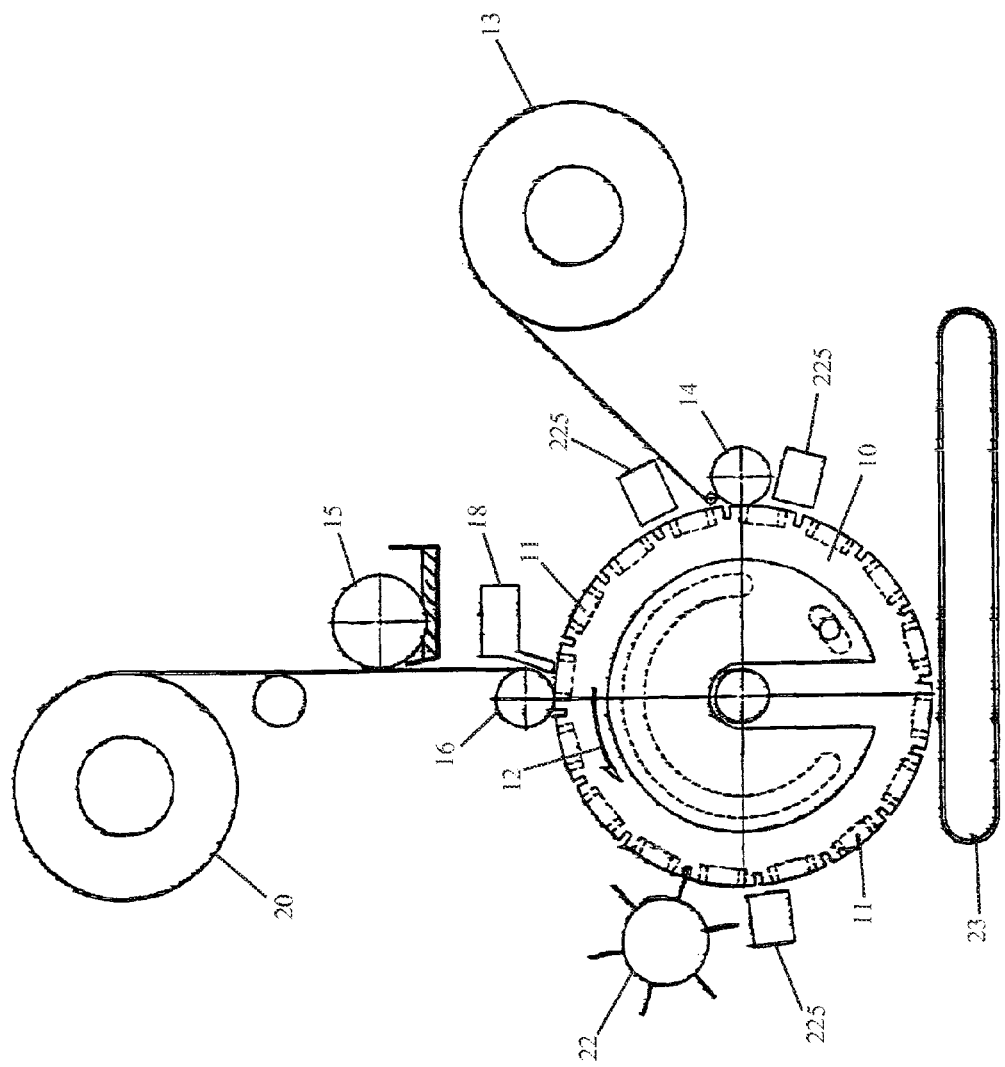
FIG. 2 is a schematic side view of a machine according to a second embodiment of the invention having external infrared heaters.

Externally mounted infra-red heaters (shown at 225 in FIG. 2). These can suitably be located at the same points around the drum as the hot air heaters, although the number and position of these locations can be varied. This is schematically illustrated in FIG. 2.

Figure 3:
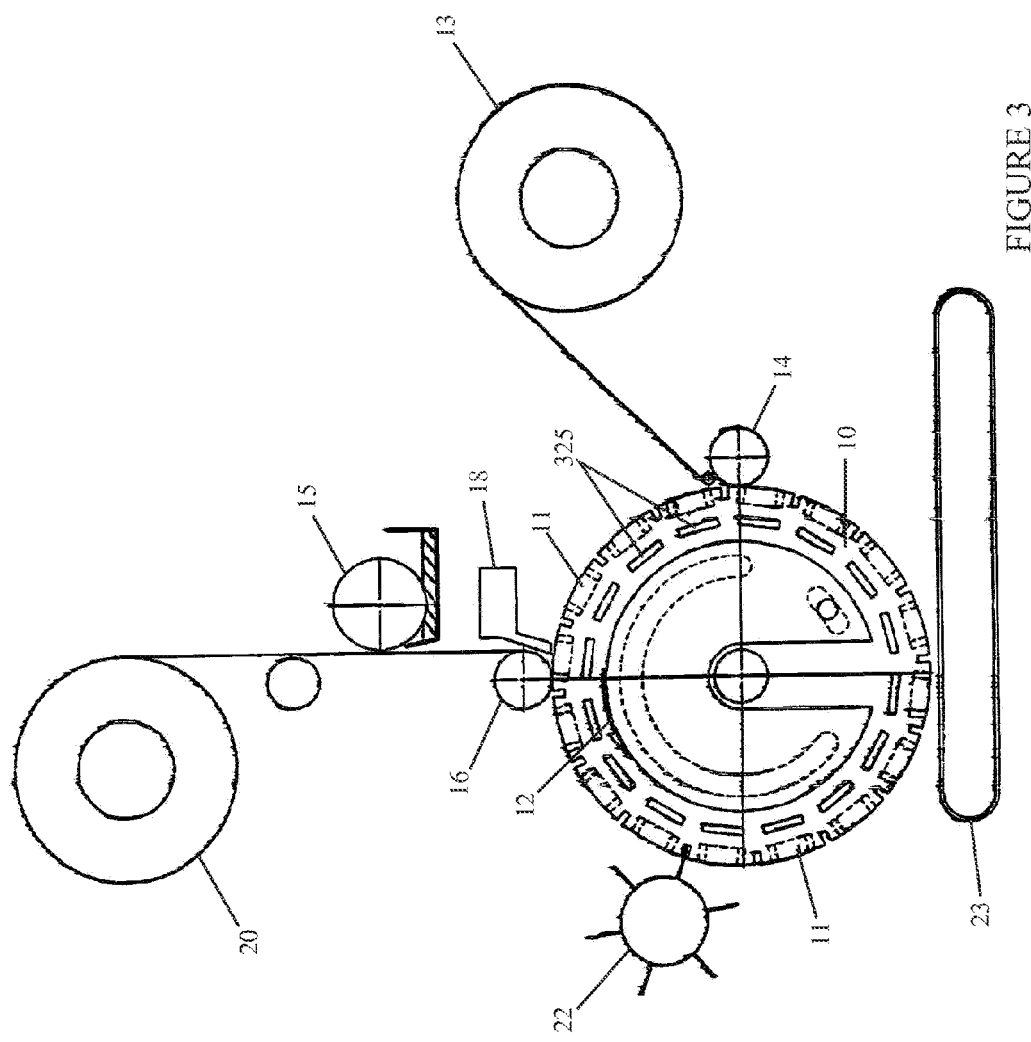
FIG. 3 is a schematic side view of a machine according to a third embodiment of the invention having internal heaters.

Internally mounted electrical heaters (shown at 335 in FIG. 3) located within the former itself. These are located near to the surface of the former in order that heat is easily transferred to the cavities. This is schematically illustrated in FIG. 3. The air for ejecting pouches from their cavities on to the conveyor 23 may be heated by this means in order to provide additional heating to the drum 10.

A combination of externally and internally mounted heaters of the type shown in FIGS. 1 to 3 or any other suitable type.

The machine may produce soluble pouches made from two or more water-soluble polymeric substrates. The dissolution temperature of the two webs may be identical. Alternatively, the dissolution temperature of the two webs may be different.

Preferably, means is provided for sealing a top web to the base web (in the case where pouches are made from two webs) or to an intermediate web (in the case where pouches are made from more than two webs). Such means may comprise at least one heat sealing roller. The strength of the seal between the webs may be enhanced by sequentially mounted heated sealing rollers. According to a preferred embodiment of the invention, a second heated sealing roller (shown at 21 in FIG. 4) is installed in such a position that it presses upon the sealed webs after they have been sealed by a first heated sealing roller 16. The addition of the second heated sealing roller has been found to greatly improve the quality of the seals. This is particularly important where the pouches are filled with liquids or gels of low viscosity. Liquids having viscosities between 10,000 and 60,000 centipoise at 20° C. have been successfully packaged by means of this arrangement.

Preferably, means is provided to coat or print a web in-line. For example, a web may be coated or printed in line by a roller mounted between the web unwind and a heated sealing roller. A third web may be introduced in order to produce two compartment pouches. In the case of multi-compartment pouches wherein the webs comprising polymeric substrates are water-soluble, the compartments of a pouch may open sequentially as a result of changes in water temperature or pH.

A coated web may be required to form the base or top web. The coating may be a colouring or any other coating that is sufficiently miscible with the solvent to form a homogeneous coating medium. This is usually achieved by procuring differently coated webs from film suppliers, which is costly and may present logistical problems, especially when there is a requirement to produce pouches of the same size with different coatings.

Figure 5:
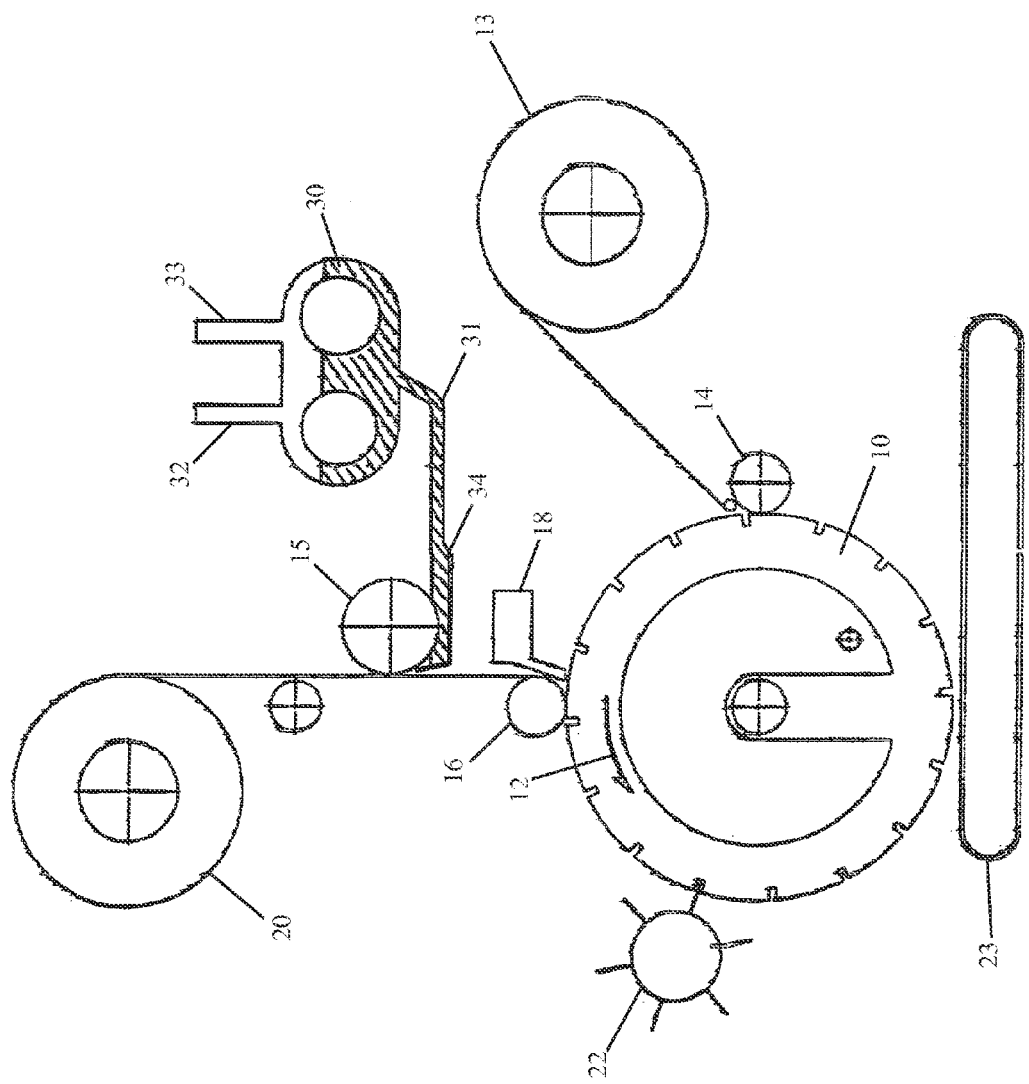
FIG. 5 is a schematic side view of a machine according to a fifth embodiment of the invention for coating a web.

According to a preferred embodiment of the invention, illustrated schematically in FIG. 5, the top web is coated in-line by adding a mixing tank 30 that is supplied by a solvent such as water through inlet tube 32 and by a coating or printing concentrate through inlet tube 33. The base web may also be coated as well as or instead of, the top web in a similar manner to that illustrated in FIG. 5. The coating or printing concentrate and water proportions are regulated within the mixing tank 30 in order to achieve the desired coat weight on the web. The coating or printing medium is then fed to the wetting tank 34 via supply tube 31. An example of a coating that can be applied to the sealing face of either web according to this aspect of the invention is a colouring, either as an ink that is miscible with the solvent or as a pigment suspension in the solvent. It will be evident that whilst colouring, perfume, or any other concentrate or active ingredient can be coated on either face of one or more of the webs by this method, the same cannot be included within the mass of a web by this method. Where inclusion within the mass of the web is required, the colouring, perfume, or any other concentrate or active ingredient must be incorporated into the mix prior to casting or extrusion of the web.

The machine may produce pouches made from two or more polymeric substrates. The polymeric substrates may be water-soluble. The dissolution temperature of the two webs may be identical. Alternatively, the dissolution temperature of the two webs may be different. In the case of multi-compartment pouches wherein the webs comprising polymeric substrates are water-soluble, the compartments of a pouch may open sequentially as a result of changes in water temperature or pH.

In one preferred embodiment, the present invention provides a continuous motion rotating thermoforming machine for producing water-soluble pouches made from two or more webs comprising water-soluble polymeric substrates including a rotating former having a plurality of pouch forming cavities around its periphery, wherein the former has means to be heated and means to apply a vacuum through the base of each cavity in order that, once thermoformed, a base web is held tightly to the base of the cavities through filling, sealing and cutting stations until the vacuum is released and the filled and sealed pouch is ejected from its cavity.

The base web may be micro-perforated or made porous by other means. Two webs (a base web and a top web) may be employed for pouches having a single compartment. One or more additional webs (intermediate webs) may be employed for pouches having two or more compartments.

For pouches having two or more compartments, the webs may dissolve under the same conditions. In this way, the compartments may open at substantially the same time. Alternatively, the webs may dissolve under different conditions. In this way the compartments may open at different times. Preferably, the compartments of the pouches open sequentially as a result of changes in water temperature or pH.

In another preferred embodiment, the present invention provides a continuous motion rotating thermoforming machine for producing water-soluble pouches containing two or more compartments made from a plurality of webs comprising water-soluble polymeric substrates, including a continuously rotating former having a plurality of cavities around its periphery, wherein the former has means to be heated and means to apply a vacuum through the base of each cavity, in order that, once thermoformed, a base web is held tightly to the base of the cavities through filling, sealing and cutting stations until the vacuum is released and the filled and sealed pouch is ejected from its cavity.

The base web may be micro-perforated or made porous by other means. In the case of pouches containing two compartments, a third web may be provided.

The machine may produce pouches made from three polymeric substrates. The polymeric substrates may be water-soluble. The dissolution temperature of the three webs may be identical. In this way, the compartments may open at substantially the same time. Alternatively, the dissolution temperature of the three webs may be different. In this way the compartments may open at different times. Preferably, the compartments of the pouches open sequentially as a result of changes in water temperature. Alternatively or additionally, the pouches may open as a result of changes in pH or any other factor affecting solubility of the polymeric materials employed.

Figure 6:
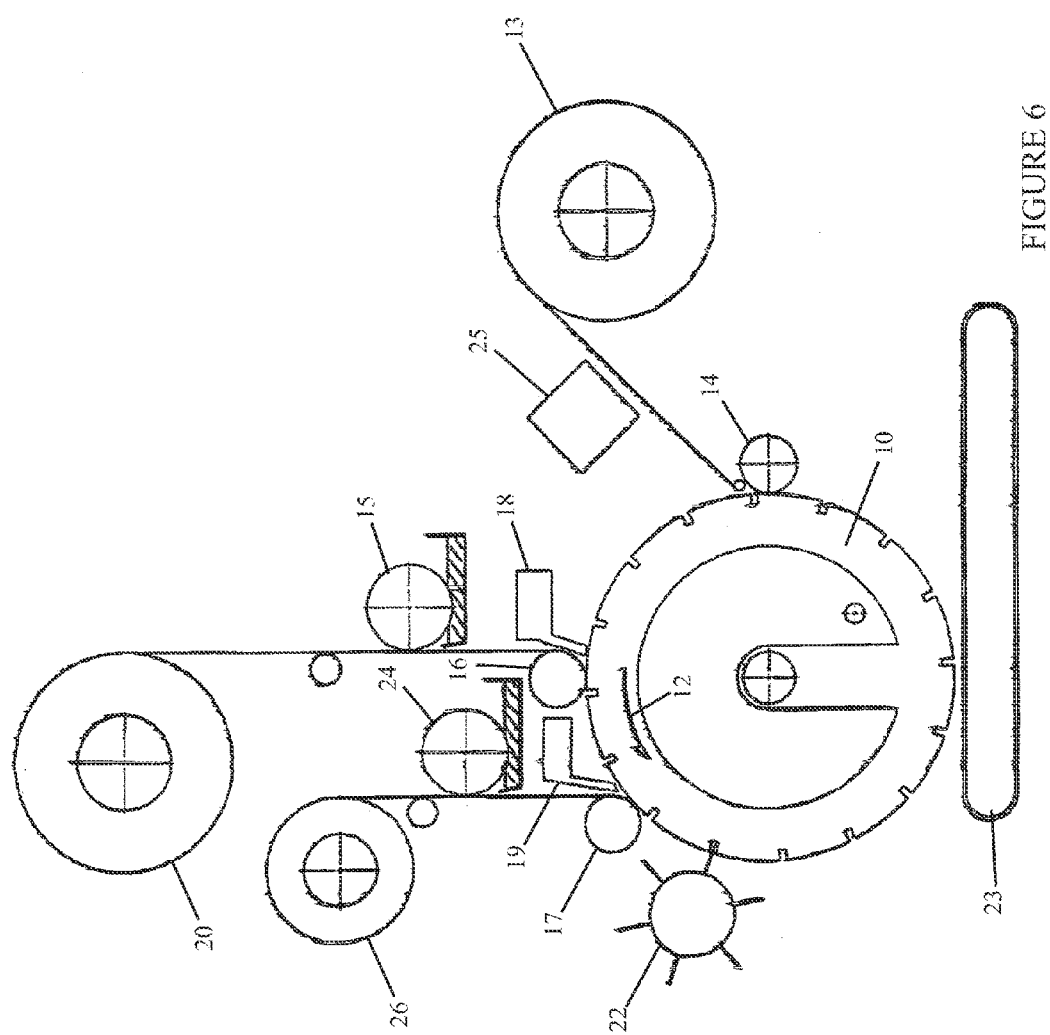
FIG. 6 is a schematic side view of a machine according to a sixth embodiment of the invention for producing pouches having more than one compartment.

According to a preferred embodiment, the third web is mounted on the machine in order to provide pouches having two compartments as schematically illustrated in FIG. 6. The base web 13 is fed into the machine as described previously. However, in this embodiment of the invention, the base web is micro-perforated or made porous by other means either by the supplier or in-line by means of a perforation unit 25 mounted on the machine or by other means. As soon as the porous base web has reached the heated drum or endless belt, the micro-perforations or other porous means allow air to be drawn through the base web by means of the vacuum within the former. In the case of micro-perforation, the number, size and pattern of the micro-perforations should be insufficient to interfere with effective thermoforming of the base web. The first product is filled from the first product hopper or injector 18 and a second web 20 is then sealed to the base web to make a first lower compartment in a similar manner to that described in earlier aspects of the invention. However, the presence of micro-perforations or other porous means in the base web now allow the lower compartment to be evacuated by the vacuum within the drum or endless belt as soon as the second web has been sealed to the base web. As a result of the evacuation of air from the first lower compartment through the micro-perforations or other porous means, the second web 20 is drawn down into the cavity thereby creating space for the second product to be filled from product hopper or injector 19 on top of the second web thereby creating a second upper compartment. This second upper compartment is now filled and then closed by sealing with the third web 21 by means of the heated roller 17. Preferably, the lower compartment will be filled with a powder or granular product. The upper compartment can contain either a second powder or granular product or a liquid or gel product.

Other porous means can include the inclusion of mineral particles of a suitable size in a web thereby making the web porous due to the creation of minute air channels around the particles, but this means is by no means limiting. Where mineral particles are included in a web to create porosity, the particle size is typically greater than the thickness of the web.

According to a second aspect of the invention, one or more novel filling operations may be employed for varying the contents of the pouch. Examples of these operations can be seen in FIGS. 9.1, 9.2, 9.3 and 9.4, although these illustrations are by no means limiting.

In one filling operation, a spherical, hemispherical, ellipsoidal or any other three dimensional shaped object, for example a tablet or capsule although these examples are by no means limiting, may be placed in a thermoformed pocket either prior to, at the same time as, or following, the filling of a liquid, gel, granular or powder composition into one or more compartments of a water-soluble pouch.

Such a three dimensional shaped object may contain an active material not present in the liquid or gel. In the case where one or more of the materials comprised within the three dimensional shaped object is antagonistic with one or more materials comprised within the liquid or gel, the three dimensional shaped object can be coated with a water-soluble polymer, which may for example comprise the same or similar polymeric materials as comprise one or more of the webs used to make the pouch.

The three dimensional shaped object may not necessarily completely dissolve when the pouch is placed in contact with an aqueous medium. For example, it can be hollow, insoluble in an aqueous medium, and perforated such that its contents are released when placed in contact with an aqueous medium but the perforated shell of the three dimensional shaped object survives undissolved.

In another filling operation, with or without the additional presence within a compartment of a three dimensional shaped object, a combination of one or more of a liquid or gel and a granular or powder product may be present in a compartment of the water-soluble pouch. In order to prevent the components mixing with each other thereby destroying the visual identity of each, the liquid or gel may be filled at a sufficiently high temperature for it to be in molten form. At least the upper surface of the molten material solidifies so rapidly within the pocket that a granular or powder product can be subsequently filled without the components mixing substantially with each other. The temperature of the molten liquid or gel must not sufficiently high to cause any distortion of the thermoformed water-soluble web within the pocket. Where the water-soluble web within the pocket receiving the molten liquid or gel comprises substantially poly-vinyl alcohol, the temperature of the molten liquid on contact with the thermoformed web should not exceed 10° C. below the melting point of the web if distortion is to be avoided.

The base web can be micro-perforated either in-line whilst mounted on the machine or off line by the film supplier or a sub-contractor thereof, by mechanical means or by means of lasers or by any other suitable means such as a needle located in the base of each cavity. The porosity of the micro-perforated base web can be adjusted by varying the number and/or pattern of micro-perforations per square meter, or by varying the diameter of the micro-perforations. At least one micro-perforation is required in each portion of the base web that is subsequently thermoformed to comprise the base of the lower compartment.

In a third aspect, the present invention provides a continuous motion rotating thermoforming machine wherein the seal between a top web and a second web is enhanced by at least one further heated sealing roller mounted after a first heated sealing roller.

In a fourth aspect, the present invention provides a continuous motion rotating thermoforming machine wherein one or more webs is coated or printed in line on either face by a roller mounted between a web unwind and a heated sealing roller.

Machines according to the third and fourth aspects of the invention may include any of the features of the machine according to the first aspect of the invention.

The invention also provides a method of using a machine according to any preceding aspect of the invention to produce soluble pouches from two or more polymeric substrates, preferably, water soluble pouches.

The invention also provides a machine as defined in claim 1. Preferred features of the machine are defined in claims 2 to 15. A method of using the machine is defined in claims 16 to 23, a pouch made by the method is defined in claim 24, and a method of forming a pouch is defined in claim 25.

In the following description, like reference numerals are used to indicate the same or similar parts and the arrangement and operation of these parts in later embodiments will be understood from the description of earlier embodiments.

Referring first to FIGS. 1 to 6, embodiments employing a drum 10 with cavities 11 are shown. The drum is continuously rotated by any suitable means such as a motor via drive shaft 10a, preferably an electric motor and more preferably a variable speed electric motor.

In each of FIGS. 1 to 3, the drum 10 is heated and in particular cavities 11 in the drum 10 are heated by different means as described previously. In FIG. 1, externally mounted hot air heaters 125 are employed. In FIG. 2, externally mounted infra-red heaters 225 are employed. In FIG. 3, electrical heaters 325 located within the drum are employed.

The drum 10 is rotated in the direction indicated by arrow 12. Soluble pouches are formed from two webs that are drawn respectively from rolls 13 and 20. The webs preferably comprise soluble polymeric substrates such as water soluble films which may dissolve at the same temperature. The first (base) web from roll 13 is guided around a heated roller 14 which presses it tightly over cavities 11 located around the circumference of the drum into which the film is drawn by suction from within the drum 10, thus forming pockets. The surface temperature within the cavities 11 and the temperature of the heated roller 14 will depend on the type of film, its thickness, and the speed of rotation of the drum. Preferably, the surface temperature within the cavities is at least 60° C. The surface of the drum surrounding the cavities should be smooth, preferably polished. The pockets are filled at the top (12 o'clock) of the drum 10 from a filling hopper or injector 18 and in the case of a granular or powder product, the fill is smoothed by wipers (not shown) which also clean product from the upper surface of the film surrounding the pockets. The second (top or lidding) web from roll 20 is made adhesive by moistening to a sufficient extent by means of a felt roller 15 rotating within a bath of liquid in which the top web is soluble. It is important that the amount of liquid applied to the surface of the top web to make it adhesive is controlled very accurately. If too little liquid is applied, the required adhesiveness will not be obtained. If too much liquid is applied, the film will be weakened and in the limit, even dissolved. It has been found that the amount of liquid can be controlled very accurately by moving the web from roll 20 along a vertical path, which in FIGS. 1 thru 3 is defined by roller 16. By maintaining the surface of the liquid in the bath at a given height with respect to the point of application (or a given distance between the point of application and the surface of the bath), the amount of liquid actually applied to the surface of the film will be accurately controlled. The top web and base web are then pressed together as the top web passes beneath a heated roller 16 which is elastically pressed by a spring (not shown) against the surfaces of the drum 10 surrounding the cavities such that the periphery around the filled pouches is securely sealed by a combination of heat and solvent welding. While still held in their cavities by the vacuum within the drum, the sealed pouches are then separated from each other by means of transverse knives 22 and longitudinal knives (not shown), after which they are ejected by means of air blow-off and fall on to the conveyor belt 23.

Figure 4:
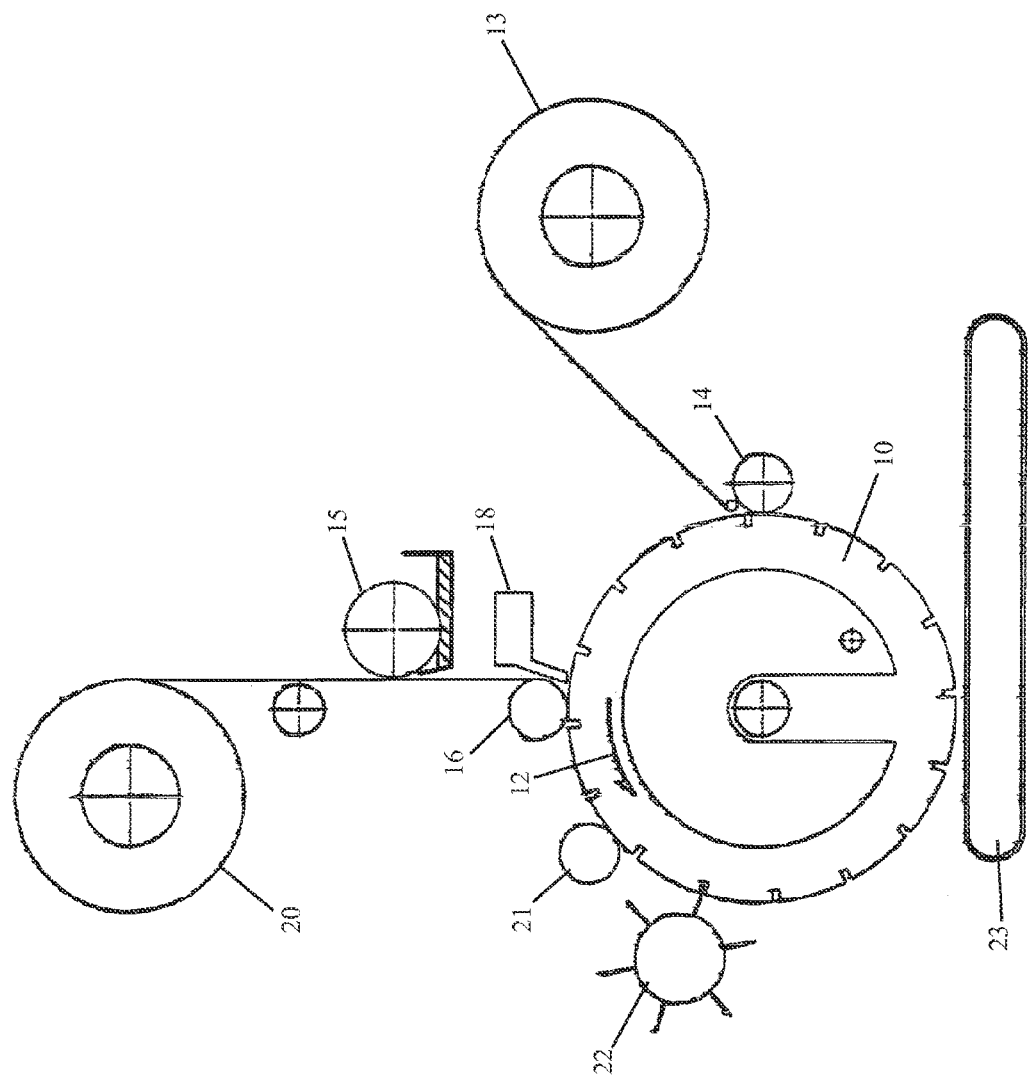
FIG. 4 is a schematic side view of a machine according to a fourth embodiment of the invention having two heat sealing rollers.

Referring now to FIG. 4. The drum 10 may be heated by any one of the different methods described above with reference to FIGS. 1 to 3 or it may be unheated, The quality of the seal between the base web and the top web is enhanced by the addition of a second heated sealing roller 21 located at between 10 and 11 o'clock. This second heated roller has been found to be particularly beneficial at enhancing the seal quality of pouches filled with liquids and gels. The enhanced quality of the seals has been evidenced by rigorous comparative testing within a vacuum chamber of sealed pouches made with and without the use of a second heated roller 21. Other features of the machine will be understood from the description of previous embodiments.

Referring now to FIG. 5. The drum 10 may be heated by any one of the different methods described above with reference to FIGS. 1 to 3 or it may be unheated. The top web from roll 20 may be coated or printed prior to its arrival at the drum. Whilst it is more usual for the top web to be coated or printed on its sealing surface, this invention allows a web to be coated on either side. Whilst an obvious application is to apply a colour coating to the sealing surface of the top web, any type of coating can be imagined including perfumes, enzymes and active ingredients. The coating may be conveniently prepared in an adjacently situated mixing tank 30 before being fed to the moistening bath 34 via supply tube 31. Other features of the machine will be understood from the description of previous embodiments.

Referring now to FIG. 6. The drum 10 may be heated by any one of the different methods described above with reference to FIGS. 1 to 3 or it may be unheated. Multi-compartment pouches are produced using additional webs in addition to the two webs described in previous aspects of the invention. In this embodiment, the base web from roll 13 is preferably micro-perforated by an in-line perforation unit 25 or off-line by the film supplier or by a sub-contractor. The perforations made by the in-line unit 25 may be made mechanically, by laser, or by any other suitable means. The base web may also be perforated during the thermoforming process by means of one or more needles located at the base of each cavity. The pocket formed by the base web is filled from hopper or injector 18 and closed by the web from roll 20. Once the lower filled compartment formed by the base web and the second web from roll 20 has been sealed by the first heated roller 16, the presence of perforations in the base web 13 comprising the thermoformed substrate of the first compartment, allows the lower compartment to be evacuated of any air contained within the filled product by means of the vacuum within the drum. As a result of evacuating the air from within the product that has been filled and sealed within the lower compartment, the second web from roll 20 comprising the lid of the lower filled and sealed compartment may be drawn down by the vacuum within the drum such that space is created within the cavity for an upper compartment which can then be filled with product from the hopper or injector 19. In turn, a top web 21 is drawn from an unwind, moistened with solvent by means of a felt roller 24 and then sealed by a heated roller 17 to form an upper compartment in the pouch. Other features of the machine will be understood from the description of previous embodiments.

Other methods of producing multi-compartment pouches may be used avoiding the need for micro-perforation of the base web. The base web may be made porous by means other than micro-perforation such as by impregnating the base web with particulate matter providing minute path ways through the web, although this example of how the base web may be rendered porous is by no means limiting. By whatever method the base web is rendered porous, the second web may be pulled down into the cavity by means of the vacuum within the drum in a similar manner to that described above where the base web was perforated. Alternatively, the base web may not be rendered porous and instead of using the vacuum within the drum or endless belt to pull down the second web into the cavity, the second web may be pressed into the base of the cavity by mechanical means or by means of air jets placed externally across the web immediately prior to the filling station.

In this embodiment of the invention, when the base web has been rendered porous by whatever means, the product contained within the lower compartment is preferably granular or powdery in nature in order to prevent escape of product through the porous web. In the case of pouches comprising two or more compartments, in which at least the lower compartment contains either a liquid or a gel, the base web is typically not rendered porous.

Figure 7:
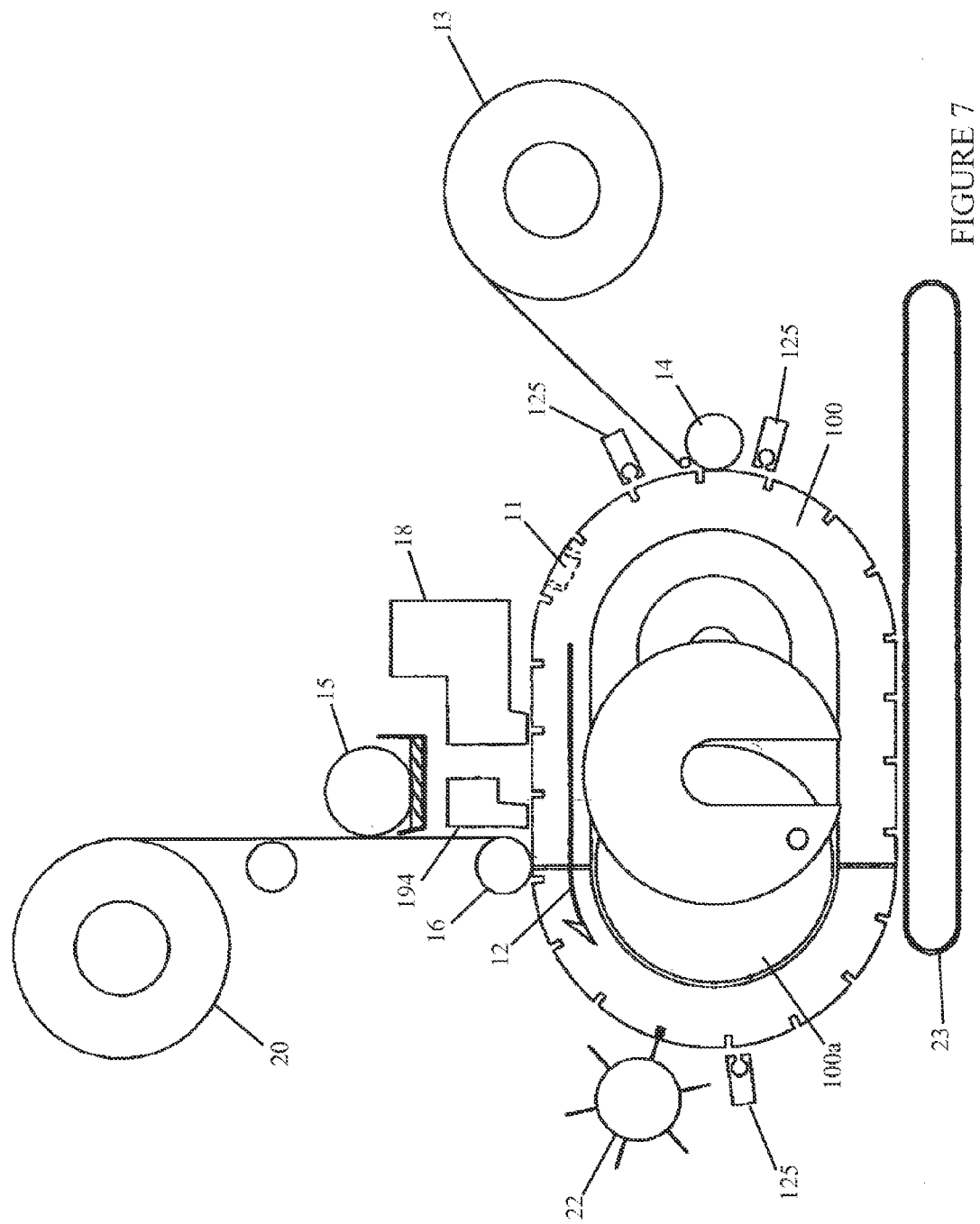
FIG. 7 is a schematic side view of a machine according to a seventh embodiment employing an endless belt.
Figure 8:
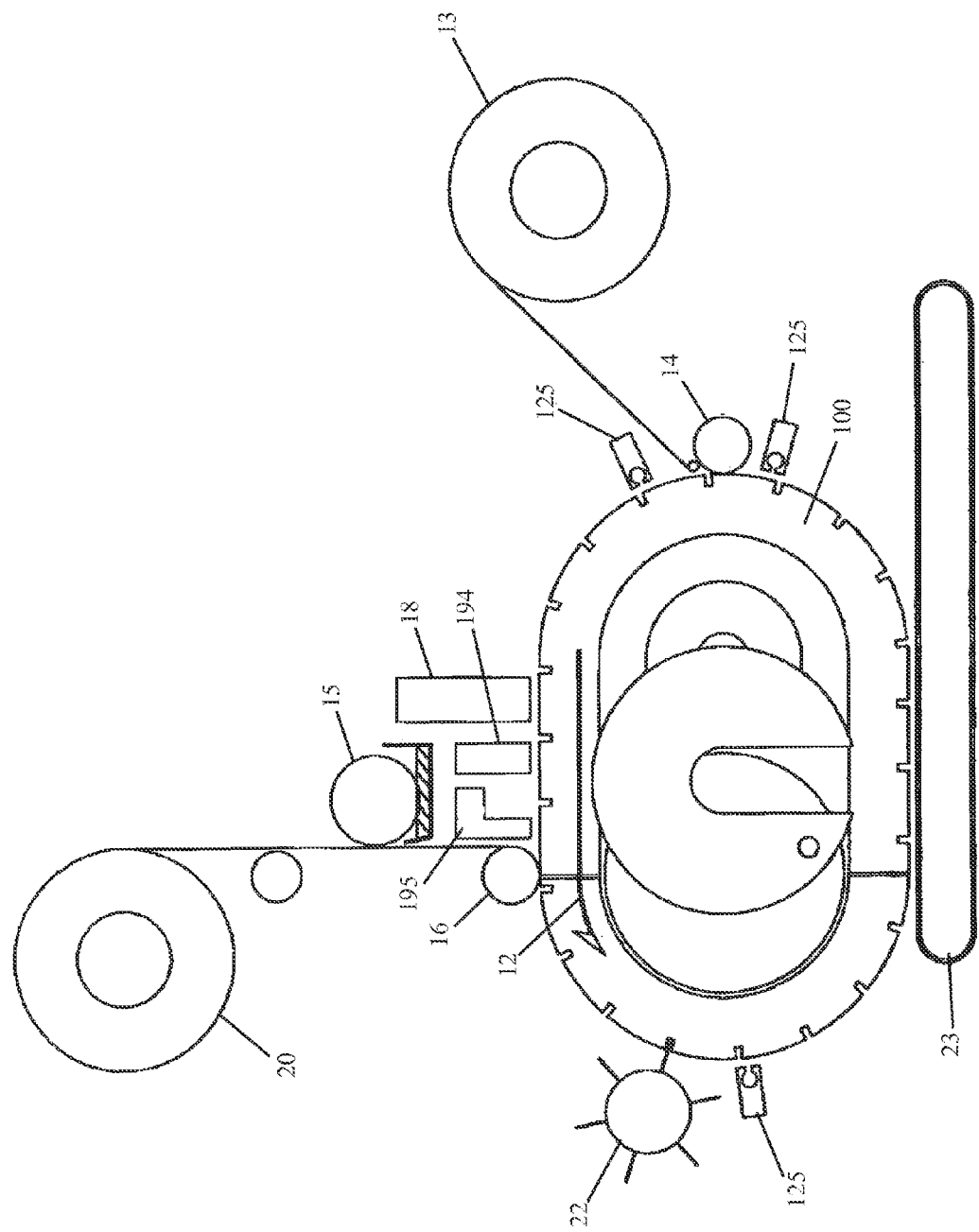
FIG. 8 is a schematic side view of a machine according to an eighth embodiment employing an endless belt.

Referring now to FIGS. 7 and 8. The drum 10 is replaced by an endless belt 100 having cavities 11. The belt 100 is illustrated in side elevation rotating in an almost elliptical path which nevertheless contains horizontal sections. This allows greater space for filling more than one product in a single compartment pouch. The belt 100 is continuously rotated by any suitable means, for example by a motor via gear wheel 100a, preferably an electric motor and more preferably a variable speed electric motor.

In FIG. 7 two filling operations are shown with two filling equipments 18 and 194 filling different products before the single compartment pouch is closed by a top web 20 being sealed to the thermoformed base web by means of a heated sealing roller 16.

In FIG. 8, three filling operations are shown with three filling equipments 18, 194 and 195, each capable of filling different products in a single compartment before the single compartment pouch is closed by a top web 20 being sealed to the thermoformed base web by means of a heated sealing roller 16.

It will be understood that the cavities contained within the endless belt 100 in FIGS. 7 and 8 can be heated by any of the means described previously. It will also be understood that the endless belt may be used to produce pouches having a single compartment or multiple compartments as described previously.

Referring now to FIGS. 9.1, 9.2, 9.3 and 9.4. Various options for filling pouches made by the above described machines are shown.

FIG. 9.1 illustrates how a single compartment pouch can contain two different products which do not mix together and thereby become potentially antagonistic. This is achieved by filling first a molten gel, and then by providing cooling means to the upper surface of the gel such that it cools sufficiently to form a skin, a granular or powder product is subsequently filled directly upon the solidified upper surface of the gel, such that the two products do not mix together.

FIG. 9.2 illustrates a single compartment pouch containing three different products which are filled such that they do not mix and thereby become potentially antagonistic. This is achieved by, in addition to what has been illustrated in FIG. 10.1, providing a three dimensional solid object, here shown as a sphere which is inserted into the molten gel before the molten gel has formed a solid skin on its upper surface. In order to prevent chemical or physical interaction between the three dimensional solid object and the molten gel, the three dimensional solid object is coated, either in-line by means of the machine of this invention or off-line using a separate process, with a polymeric material which is similar or identical to the material of either or both of the webs used to produce the pouch. The filling of the pouch is completed with a granular or powder being filled upon the by now solidified upper surface of the molten gel.

FIG. 9.3 illustrates a single compartment pouch containing three different products similar to that illustrated in FIG. 10.2 except that here, the filling of the pouch is completed with a liquid or a second type of gel being filled upon the by now solidified upper surface of the molten gel.

FIG. 9.4 illustrates a single compartment pouch containing a multiple gel fill using either stationary or rotating nozzles, each gel having a different composition, colour and/or appearance in order to create an attractive pattern within the pouch.

It will be understood that the invention in its various aspects is not limited to the embodiments above-described which are provided by way of example only and that features of any of the embodiments may be employed separately or in combination with features of any other embodiments.

List of references used in the drawings:

| | |
|---|---|
| 10 | A rotating drum |
| 10a | Drive shaft |
| 11 | Pocket forming cavities contained around the circumference of the rotating former |
| 12 | Arrow denoting the direction of rotation of the former |
| 13 | Unwind of a first web |
| 14 | Heated roller imparting heat to a base web as it arrives at the former |
| 15 | Felt roller imparting solvent to a web |
| 16 | Heated sealing roller |
| 17 | Heated sealing roller |
| 18 | Filling device, hopper or injector, filling the cavities as they pass beneath |
| 19 | Filling device, hopper or injector, allowing filling of a second compartment within a pouch |
| 20 | Unwind of a second web |
| 21 | Heated sealing roller |
| 22 | Transverse cutting knives mounted on a rotating shaft |
| 23 | Conveyor transporting sealed and filled pouches away from the machine |
| 24 | A second felt roller imparting solvent to a web |
| 25 | An in-line perforating device |
| 26 | Unwind of a third web |
| 30 | Mixing tank |
| 31 | Supply tube from mixing tank to wetting tank |
| 32 | Solvent supply tube |
| 33 | Coating or printing medium supply tube |
| 34 | Moistening bath |
| 100 | A rotating endless belt |
| 100a | Gear wheel |
| 125 | Externally mounted hot air jets |
| 194 | Filling device, hopper or injector, allowing filling of a second product within a pouch comprising a single compartment |
| 195 | Filling device, hopper or injector, allowing filling of a third product within a pouch comprising a single compartment |
| 225 | Externally mounted infra-red heaters |
| 325 | Internally mounted electrical heaters |

What is claimed is:

1. A continuous motion rotating thermoforming machine for producing pouches made from two webs comprising soluble polymeric substrates, the machine comprising:
   a former having a plurality of pouch forming cavities around its periphery;
   a forming station, a filling station, a sealing station, and a cutting station disposed sequentially around the former;
   a motor configured to continuously rotate the former so that the cavities follow an endless path in the direction of rotation of the former sequentially through the forming, filling, sealing and cutting stations;
   one or more heaters disposed around the former for heating the cavities; and
   a vacuum configured to apply a vacuum through the base of each cavity in order that, once thermoformed, a base web is held tightly to the base of the cavities through filling, sealing and cutting stations until the vacuum is released and the filled and sealed pouch is ejected from its cavity;
   wherein the vacuum applies different levels of vacuum at different positions around the former as it rotates.

2. The machine of claim 1, further including a device configured to supply compressed air through the base of each cavity such that filled and sealed pouches can be ejected from the cavities after the cutting station.

3. The machine of claim 1, wherein the one or more heaters are configured to produce a surface temperature within one or more cavities of at least 60° C.

4. The machine of claim 1, wherein the one or more heaters are hot air jets.

5. The machine of claim 1, wherein the one or more heaters are infra-red heaters.

6. The machine of claim 1, wherein the one or more heaters are internally mounted heating elements located around the former.

7. The machine of claim 1, wherein the one or more heaters are selected from the group consisting of externally mounted hot air jets, externally mounted infra-red heaters, internally mounted heating elements located around the former, and combinations thereof.

8. The machine of claim 1, further comprising at least one heated sealing roller configured to seal two webs together to thereby form a pouch.

9. The machine of claim 1, wherein two or more heated sealing rollers are arranged to seal sequentially two webs together to thereby form a pouch.

10. The machine of claim 1, wherein the former comprises a rotatable drum or a rotatable endless belt.

11. The machine of claim 1, further comprising a perforation unit configured to perforate a base web.

12. The machine of claim 1, wherein the one or more heaters are disposed around the former to heat the cavities through forming, filling, sealing and cutting stations.

13. The machine of claim 1, wherein the vacuum is arranged to apply a higher level of vacuum after the cavities are filled and sealed to hold filled and sealed pouches on the former until the vacuum is released.

14. The machine of claim 1, wherein the vacuum is released after the cutting station and the filled and sealed pouches ejected from the cavities.

15. The machine of claim 1, wherein more than one filling station is provided in the direction of rotation of the former.

16. The machine of claim 1, wherein a first of the one or more heaters is arranged to heat a first cavity of the plurality of pouch forming cavities in sequence after the first cavity passes through the cutting station and before the first cavity passes through the forming station.

17. The machine of claim 1, wherein at the forming station, the vacuum is configured to draw the base web into one or more of the plurality of pouch forming cavities to form a pouch.

18. The machine of claim 17, further comprising a roller at the forming station, the roller being positioned to press the base web tightly over one or more of the plurality of pouch forming cavities.

19. The machine of claim 1, wherein at the filling station, the machine is configured to at least partially fill a pouch formed in the base web at the forming station with a component.

20. The machine of claim 1, wherein at the sealing station, the machine is configured to couple the base web having a pouch formed therein to a second web to seal a component in the pouch.

21. The machine of claim 20, further comprising a heated roller at the sealing station, the heated roller being positioned to press the second web against the base web.

22. The machine of claim 1, wherein at the cutting station, the machine is configured to cut the filled and sealed pouch from the two webs prior to the filled and sealed pouch being removed from one of the pouch forming cavities of the former.

23. A continuous motion rotating thermoforming machine for producing pouches made from two webs comprising soluble polymeric substrates, the machine comprising:
- a former having a plurality of pouch forming cavities around its periphery;
- a forming station, a filling station, a sealing station, and a cutting station disposed sequentially around the former;
- a motor configured to continuously rotate the former so that the cavities follow an endless path in the direction of rotation of the former sequentially through the forming, filling, sealing and cutting stations;
- one or more heaters disposed around the former for heating the cavities; and a vacuum configured to apply a vacuum through the base of each cavity in order that, once thermoformed, a base web is held tightly to the base of the cavities through filling, sealing and cutting stations until the vacuum is released and the filled and sealed pouch is ejected from its cavity;
- a perforation unit configured to perforate a base web; and
- a second forming station;
- wherein the perforation unit is positioned to perforate the base web before the base web is drawn by the vacuum into one of the cavities at the forming station to form a pouch; and
- wherein at the second forming station, the machine is configured for the vacuum to draw a second web into the first cavity to form a first compartment in the pouch between the base web and the second web and to form a second compartment in the pouch that is separated from the first compartment by the second web.

24. The machine of claim 23, wherein the vacuum is configured to evacuate the pouch through perforations in the base web.

25. The machine of claim 1, wherein the base web is perforated or porous, and at the forming station, the vacuum is configured to draw the base web into a first cavity of the plurality of pouch forming cavities to form a pouch.

26. The machine of claim 25, wherein the vacuum is configured to evacuate the pouch through perforations or porosity of the base web.

27. The machine of claim 23, further comprising a second filling station, wherein the second forming station and the second filling station are disposed about the former such that the motor rotates the former sequentially through the first forming station, the first filling station, the second forming station, the second filling station, the sealing station, and the cutting station.

28. The machine of claim 23, wherein the filling station is configured to at least partially fill the first compartment with a powder or granular product.

* * * * *